United States Patent
Eguchi (10) Patent No.: US 6,975,461 B2
(45) Date of Patent: Dec. 13, 2005

(54) ZOOM LENS SYSTEM

(75) Inventor: Masaru Eguchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/412,579

(22) Filed: Apr. 14, 2003

(65) Prior Publication Data

US 2003/0197950 A1    Oct. 23, 2003

(30) Foreign Application Priority Data

Apr. 19, 2002  (JP)  ............... 2002-117210

(51) Int. Cl.[7] ............................................. G02B 15/14
(52) U.S. Cl. ..................... 359/687; 359/684
(58) Field of Search ................ 359/687, 684

(56) References Cited

U.S. PATENT DOCUMENTS

| | | |
|---|---|---|
| 5,100,223 A | 3/1992 | Ono et al. |
| 5,363,242 A | 11/1994 | Yokota |
| 5,570,233 A | 10/1996 | Mihara et al. |
| 6,052,235 A | 4/2000 | Ozaki |
| 6,128,140 A | 10/2000 | Yoneyama |
| 6,353,505 B1 | 3/2002 | Yoneyama |
| 6,456,441 B2 * | 9/2002 | Hoshi .......................... 359/687 |
| 6,487,023 B2 | 11/2002 | Yoneyama |
| 6,580,565 B2 | 6/2003 | Ozaki |
| 6,633,437 B1 * | 10/2003 | Hoshi et al. ................. 359/687 |
| 6,650,475 B1 * | 11/2003 | Hamano ...................... 359/557 |

FOREIGN PATENT DOCUMENTS

JP    5-27167    2/1993

* cited by examiner

Primary Examiner—Scott J. Sugarman
(74) Attorney, Agent, or Firm—Greenblum & Bernstein, P.L.C.

(57) ABSTRACT

A zoom lens system includes a movable positive first lens group, a movable negative second lens group, a movable positive third lens group, and movable stationary or positive fourth lens group. Upon zooming, the distance between the first and second lens groups is increased; the distance between the second and the third lens groups is decreased; and the distance between the third and the fourth lens groups is increased.

5 Claims, 11 Drawing Sheets

—— d Line
········ g Line
--- C Line

-0.2   0.2
SPHERICAL
ABERRATION
CHROMATIC
ABERRATION

Fig. 2B
$W=31.5°$

-0.02   0.02
LATERAL
CHROMATIC
ABERRATION

-0.2   0.2
ASTIGMATISM

Fig. 2D
$W=31.5°$

-5  (%)  5
DISTORTION

Fig. 3A
F$_{NO.}$= 1:3.5

— d Line
····· g Line
---- C Line

-0.2  0.2
SPHERICAL
ABERRATION

CHROMATIC
ABERRATION

Fig. 3B
W=14.3°

-0.02  0.02
LATERAL
CHROMATIC
ABERRATION

-0.2  0.2
ASTIGMATISM

Fig. 3D
W=14.3°

-5 (%) 5
DISTORTION

Fig. 4A
F$_{NO.}$=1:4.9

— d Line
····· g Line
---- C Line

-0.2  0.2
SPHERICAL
ABERRATION

CHROMATIC
ABERRATION

Fig. 4B
W=6.9°

-0.02  0.02
LATERAL
CHROMATIC
ABERRATION

-0.2  0.2
ASTIGMATISM

Fig. 4D
W=6.9°

-5 (%) 5
DISTORTION

—— d Line
······ g Line
---- C Line

-0.2   0.2
SPHERICAL
ABERRATION

CHROMATIC
ABERRATION

-0.02   0.02
LATERAL
CHROMATIC
ABERRATION

-0.2   0.2
ASTIGMATISM

-5  (%)  5
DISTORTION

Fig. 7A
$F_{NO.}=1:3.5$

-0.2  0.2
SPHERICAL
ABERRATION

CHROMATIC
ABERRATION

— d Line
··· g Line
--- C Line

Fig. 7B
W=14.2°

-0.02  0.02
LATERAL
CHROMATIC
ABERRATION

Fig. 7C
W=14.2°

-0.2  0.2
ASTIGMATISM

-5 (%) 5
DISTORTION

Fig. 8A
$F_{NO.}=1:4.7$

-0.2  0.2
SPHERICAL
ABERRATION

CHROMATIC
ABERRATION

— d Line
··· g Line
--- C Line

Fig. 8B
W=7.0°

-0.02  0.02
LATERAL
CHROMATIC
ABERRATION

Fig. 8C
W=7.0°

-0.2  0.2
ASTIGMATISM

-5 (%) 5
DISTORTION

Fig. 11A
FNO.= 1:3.6

— d Line
······ g Line
---- C Line

-0.1   0.1
SPHERICAL
ABERRATION

CHROMATIC
ABERRATION

Fig. 11B
W=14.1°

-0.01   0.01
LATERAL
CHROMATIC
ABERRATION

-0.1   0.1
ASTIGMATISM

Fig. 11D
W=14.1°

-5 (%) 5
DISTORTION

Fig. 12A
FNO.= 1:4.9

— d Line
······ g Line
---- C Line

-0.1   0.1
SPHERICAL
ABERRATION

CHROMATIC
ABERRATION

Fig. 12B
W=6.9°

-0.01   0.01
LATERAL
CHROMATIC
ABERRATION

-0.1   0.1
ASTIGMATISM

Fig. 12D
W=6.9°

-5 (%) 5
DISTORTION

—— d Line
······· g Line
- - - C Line

-0.2  0.2
SPHERICAL
ABERRATION

CHROMATIC
ABERRATION

Fig. 14B
W=31.8°

-0.01  0.01
LATERAL
CHROMATIC
ABERRATION

-0.2  0.2
ASTIGMATISM

Fig. 14D
W=31.8°

-5 (%) 5
DISTORTION

Fig. 15A  F_{NO.}= 1:3.6  SPHERICAL ABERRATION CHROMATIC ABERRATION

Fig. 15B  W=14.1°  LATERAL CHROMATIC ABERRATION

Fig. 15C  W=14.1°  ASTIGMATISM

Fig. 15D  W=14.1°  DISTORTION

Fig. 16A  F_{NO.}= 1:5.1  SPHERICAL ABERRATION CHROMATIC ABERRATION

Fig. 16B  W=6.9°  LATERAL CHROMATIC ABERRATION

Fig. 16C  W=6.9°  ASTIGMATISM

Fig. 16D  W=6.9°  DISTORTION

— d Line
······ g Line
- - - C Line

-0.1   0.1
SPHERICAL
ABERRATION

CHROMATIC
ABERRATION

Fig. 18B
W=31.6°

-0.01   0.01
LATERAL
CHROMATIC
ABERRATION

-0.1   0.1
ASTIGMATISM

Fig. 18D
W=31.6°

-5  (%)  5
DISTORTION

Fig. 19A
F_NO.= 1:3.5

-0.1   0.1
SPHERICAL
ABERRATION

CHROMATIC
ABERRATION

Fig. 19B
W=14.1°

— d Line
······ g Line
---- C Line
-0.01  0.01
LATERAL
CHROMATIC
ABERRATION

Fig. 19C
W=14.1°

— S
-- M
-0.1   0.1
ASTIGMATISM

Fig. 19D
W=14.1°

-5  (%)  5
DISTORTION

Fig. 20A
F_NO.= 1:4.7

-0.1   0.1
SPHERICAL
ABERRATION

CHROMATIC
ABERRATION

Fig. 20B
W=6.9°

— d Line
······ g Line
---- C Line
-0.01  0.01
LATERAL
CHROMATIC
ABERRATION

Fig. 20C
W=6.9°

— S
-- M
-0.1   0.1
ASTIGMATISM

Fig. 20D
W=6.9°

-5  (%)  5
DISTORTION

Fig. 21

ZOOM LENS SYSTEM

BACKGROUND OF THE INVENTION

1. Field of the Invention

The present invention relates to a zoom lens system mainly used in an electronic still camera (digital camera) having a zoom ratio more than 4 and including a wide angle range (half angle-of-view of more than 30°).

2. Description of the Prior Art

In recent years, there has been an increasing need for further miniaturization and higher definition in digital cameras; and the pixels of CCD imaging devices are further miniaturized. Accordingly, photographic lens systems of such digital cameras are required to have high resolution. Furthermore, a long back focal distance is also required in order to accommodate a filter group. In addition, an optical system for a color CCD is required to have good 'telecentricity' in order to prevent shading and color shift, i.e., the light rays which exit from the final lens surface and are incident on the imaging surface are to be as perpendicular to the imaging surface as possible.

As a miniaturized zoom lens system for a compact digital camera, a front-negative lens system (negative-lead type lens system) can be used in the case where a zoom ratio is up to around 3 to 4. Such lens systems can provide a wider viewing angle at the short focal length extremity, and can achieve further miniaturization of the lens system. In particular, the lens diameter of the first lens group (the most object-side lens element) can be made smaller. Due to the above features, the negative-lead type lens system is suitable for a 'telescoping' zoom lens system in which the distance between the lens groups is made shorter in an accommodating position. However, in such a zoom lens system, it is difficult to achieve a zoom ratio of more than 4.

A zoom lens system disclosed in U.S. Pat. No. 5,100,223 can be taken as an example of a zoom lens system having a zoom ratio of more than 4. In this zoom lens system, a zoom ratio of about 6 is achieved; however, the lens diameter of the front lens group is large, and miniaturization thereof is insufficient. Furthermore, the half angle-of-view at the short focal length extremity is about 25°. This means that the focal length at the short focal length extremity is sufficiently short thereat.

As another example, a zoom lens system disclosed in U.S. Pat. No. 5,570,233 achieves a wide angle-of-view, i.e., a sufficient short focal length at the short focal length extremity; however, the diameter of the front lens group is large, and a large number of lens elements are required. Accordingly, this zoom lens system is not appropriate for a camera having a telescoping zoom lens system.

In a zoom lens system for a compact telescoping-type zoom lens camera, thickness of each lens group is required to be smaller, in addition to a smaller lens diameter of the front lens group and a shorter overall length of the lens system. Generally, if an attempt is made to reduce the number of lens elements in order to reduce the thickness of the lens groups, the correcting of aberrations, on the other hand, becomes difficult. In order to adequately correct aberrations over the entire zooming range while further miniaturization is achieved, an appropriate refractive power distribution over each lens group and an appropriate lens arrangement are necessary.

SUMMARY OF THE INVENTION

The present invention provides a zoom lens system for a digital camera having a zoom ratio of more than 4, and having a half angle-of-view of more than 30° at the short focal length extremity.

According to an aspect of the present invention, there is provided a zoom lens system including a positive powered (hereinafter, positive) first lens group which is movable, a negative powered second lens group (hereinafter, negative) which is movable, a positive third lens group which is movable, and positive fourth lens group which is movable or stationary, in this order from the object.

Upon zooming from the short focal length extremity to the long focal length extremity, the distance between the positive first lens group and the negative second lens group is increased; the distance between the negative second lens group and the positive third lens group is decreased; and the distance between the positive third lens group and the positive fourth lens group is increased.

The zoom lens system satisfies the following conditions:

$$0.5 < |f2|/f3 < 1.0 \, (f2<0) \tag{1}$$

$$2 < m3t/m3w < 4 \tag{2}$$

wherein fi designates the focal length of the ith lens group (i=1~3);

m3t designates the paraxial lateral magnification of the positive third lens group at the long focal length extremity when an object at infinity is in an in-focus state; and m3w designates the paraxial lateral magnification of the positive third lens group at the short focal length extremity when an object at infinity is in an in-focus state.

For the purpose of reducing the number of lens elements, the lens groups of the zoom lens system according to the present invention preferably include as follows:

(i) the positive first lens group includes one positive lens element, or includes one negative lens element and one positive lens element;

(ii) the positive third lens group includes one positive lens element and one negative lens element, or includes two positive lens elements and one negative lens element; and (iii) the positive fourth lens group includes one positive lens element.

In the cases of the above (i) to (iii), the negative second lens group can include two negative lens elements and one positive lens element.

The positive fourth lens group which is arranged to be stationary or movable upon zooming can be used as a focusing lens group.

The present disclosure relates to subject matter contained in Japanese Patent Application No. 2002-117210 (filed on Apr. 19, 2002) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 21:
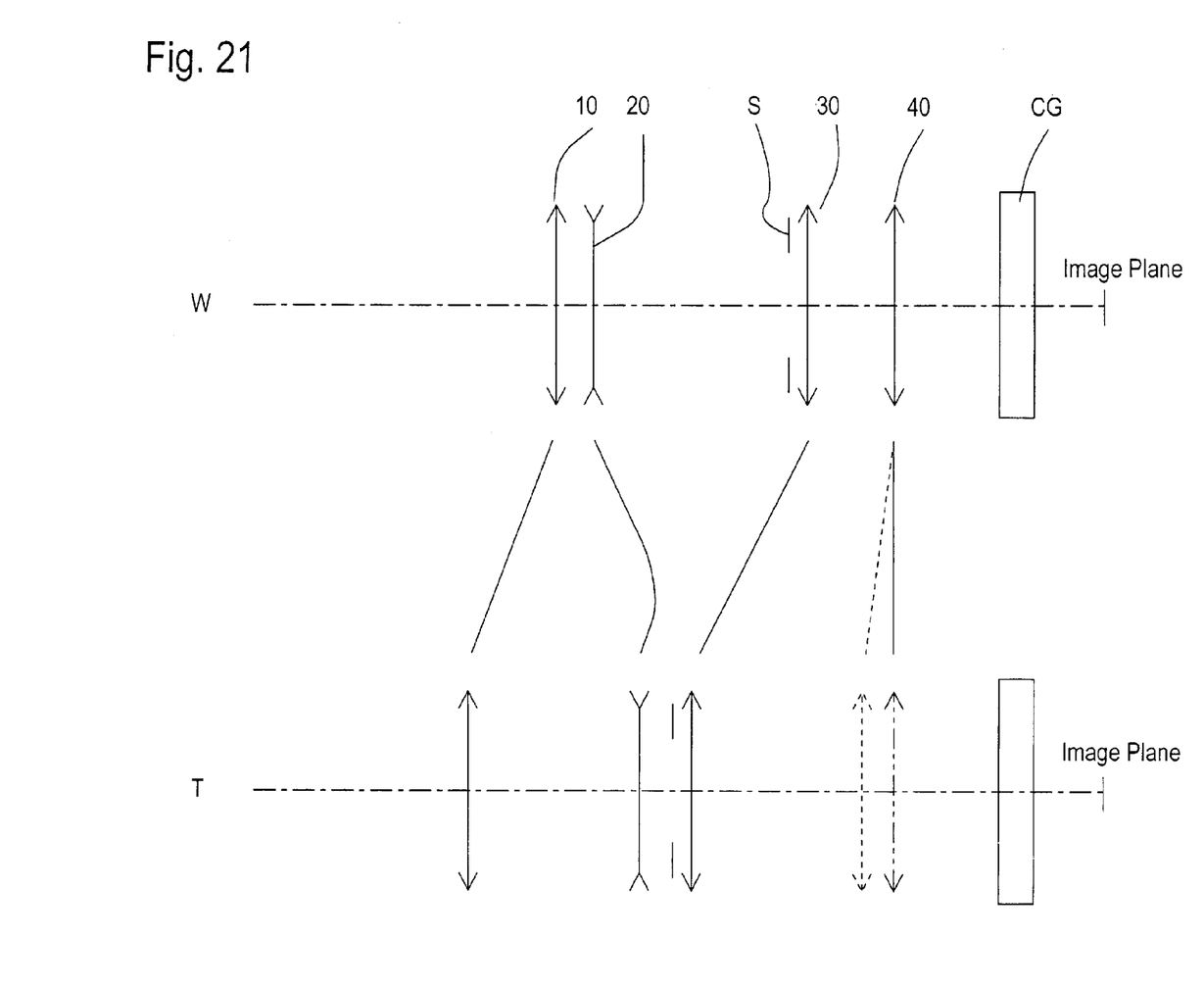
FIG. 21 shows a schematic lens-group moving paths of the zoom lens system according to the present invention.

The zoom lens system of the present invention, as shown in the schematic lens-group moving paths of FIG. 21, includes a positive first lens group 10, a negative second lens group 20, a diaphragm S, a positive third lens group 30, and a positive fourth lens group 40, in this order from the object.

In the zoom lens system of this four-lens-group arrangement, upon zooming from the short focal length extremity (W) to the long focal length extremity (T), the distance between the positive first lens group 10 and the negative second lens group 20 is increased, the distance between the negative second lens group 20 and the positive third lens group 30 is decreased, and the distance between the positive third lens group 30 and the positive fourth lens group 40 is increased. The positive fourth lens group 40 can either be stationary (first and second embodiments) as shown by a two-dot chain line, or movable (third and fourth embodiments) as shown by a dotted line. The diaphragm S moves together with the positive third lens group 30. Focusing is carried out by the positive fourth lens group 40. A symbol CG designates a cover glass (plane-parallel plate) for an infrared-cut filter group provided in front of an imaging device.

Condition (1) specifies the refractive-power ratio of the negative second lens group 20 to the positive third lens group 30, which mainly perform zooming for the zoom lens system.

If $|f2|/f3$ exceeds the lower limit of condition (1), the negative refractive power of the negative second lens group 20 becomes larger, so that aberration fluctuations upon zooming undesirably increase.

If $|f2|/f3$ exceeds the upper limit of condition (1), the negative refractive power of the negative second lens group 20 becomes smaller and the positive refractive power of the positive third lens group 30 also becomes smaller, so that the overall length of the zoom lens system becomes longer.

Condition (2) specifies the ratio of the paraxial lateral magnification at the short focal length extremity to the paraxial lateral magnification at the long focal length extremity, under the condition that an object at infinity is in an in-focus state. By satisfying this condition, the burden of zooming on the positive third lens group 30 is appropriately determined, and the diameter of the front lens group (positive first lens group 10) can be made smaller.

If $m3t/m3w$ exceeds the lower limit of condition (2), the burden of zooming on the positive third lens group 30 is reduced, so that the burden of zooming on the negative second lens group 20 is increased when an attempt is made to achieve a zoom ratio of more than 4. Consequently, the height of marginal ray of the positive first lens group 10 at the long focal length extremity increases, so that the diameter of the positive first lens group 10 is increased.

If $m3t/m3w$ exceeds the upper limit of condition (2), the burden of zooming on the positive third lens group 30 is increased, so that the traveling distance of the positive third lens group 30 upon zooming becomes longer. Consequently, the f-number at the long focal length extremity is increased.

In order to reduce the length of the optical system at the accommodating position, it is necessary to reduce the number of lens elements in each lens group. Furthermore, the positive first lens group 10 preferably includes a positive lens element and a negative lens element, or one positive lens element. This is because the front lens diameter becomes larger if the number of lens elements is increased. Also, in order to further reduce the length of the optical system at the accommodating position, the positive third lens group 30 preferably includes a positive lens element and a negative lens element, or two positive lens elements and a negative lens element.

However, in the case where the positive third lens group 30 includes a positive lens element and a negative lens element, i.e., a two-lens-element arrangement, the refractive power of the positive lens element becomes strong, so that it is difficult to reduce fluctuations of spherical aberration or the like which occurs upon zooming. Therefore an aspherical surface can be provided on at least one surface of the positive lens element. More preferably, if aspherical surfaces are provided on both surfaces of the positive lens element, fluctuations of spherical aberration and coma upon zooming can be adequately reduced. In addition to the above, the positive lens element preferably satisfies the following condition:

$$\nu s < 23 \tag{3}$$

wherein

νs designates the Abbe number with respect to the d-line of a positive lens element in the case where the positive third lens group 30 includes the positive lens element and a negative lens element.

If νs exceeds the lower limit of condition (3), fluctuations in axial-lateral chromatic aberrations which occur upon zooming become larger, so that adequate imaging-forming performance cannot be achieved.

The positive fourth lens group 40 can include a positive single lens element.

Specific numerical embodiments will be herein discussed. In the following first through fifth embodiments, the positive fourth lens group 40 is stationary upon zooming in the first and second embodiments, and the positive fourth lens group 40 is movable in the third to fifth embodiments. Furthermore, the positive fourth lens group 40 is a focusing lens group in all of the embodiments.

In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, Nd designates the refractive index of the d-line, and νd designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

Figure 1:
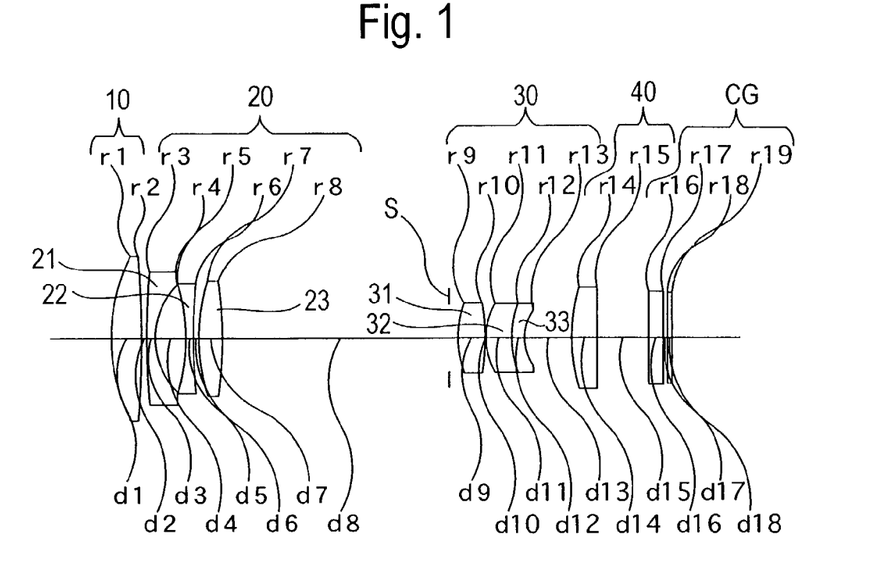
FIG. 1 is a lens arrangement of a zoom lens system according to a first embodiment of the present invention.
Figures 2A, 2B:
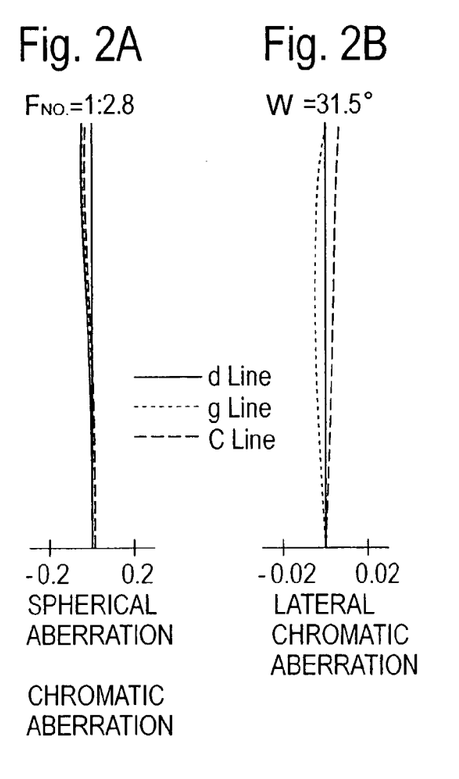
FIGS. 2A, 2B, 2C and 2D show aberrations occurred in the lens arrangement shown in FIG. 1 at the short focal length extremity.
Figure 2C:
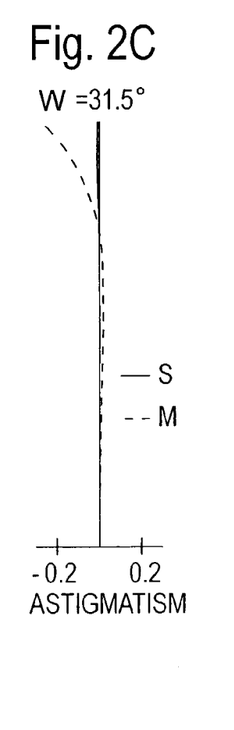
Figure 2D:
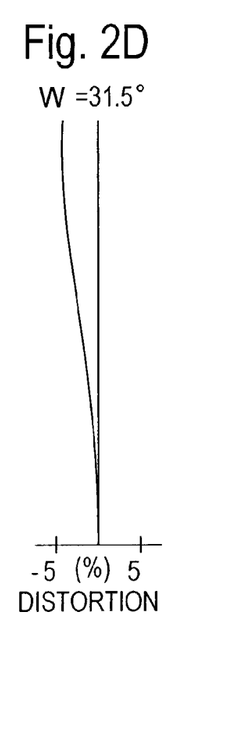
Figures 3A, 3B:
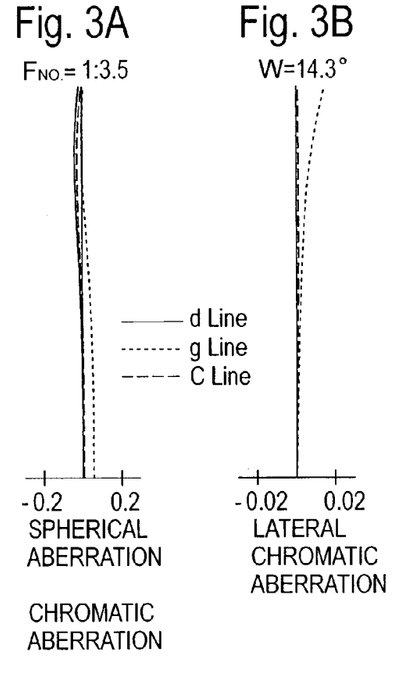
FIGS. 3A, 3B, 3C and 3D show aberrations occurred in the lens arrangement shown in FIG. 1 at an intermediate focal length.
Figure 3C:
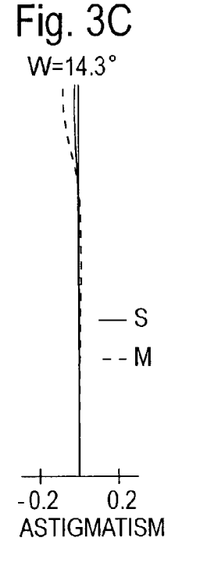
Figure 3D:
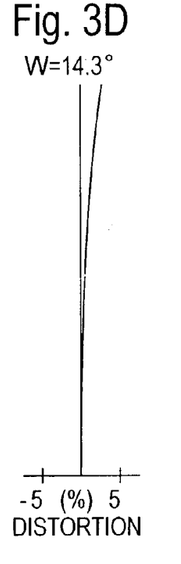
Figures 4A, 4B:
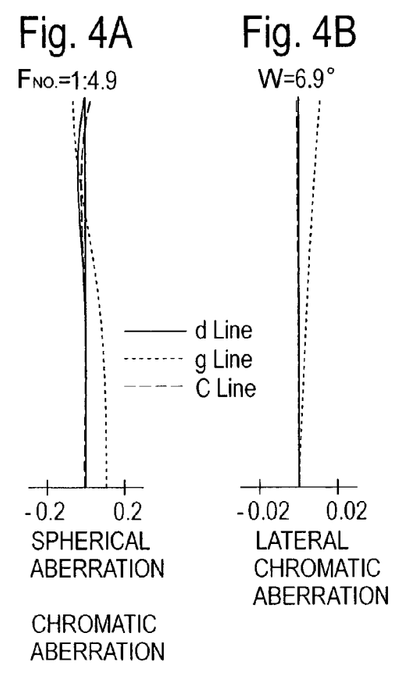
FIGS. 4A, 4B, 4C and 4D show aberrations occurred in the lens arrangement shown in FIG. 1 at the long focal length extremity.
Figure 4C:
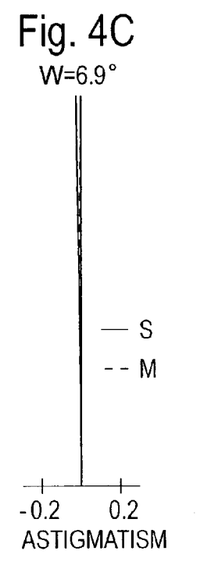
Figure 4D:
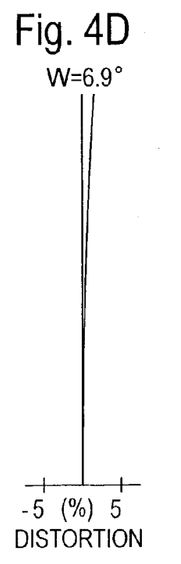

FIG. 1 is the lens arrangement of the zoom lens system according to the first embodiment of the present invention. FIGS. 2A through 2D show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical data of the first embodiment.

The positive first lens group 10 includes a single lens element. The negative second lens group 20 includes a negative lens element 21, a negative lens element 22, and a positive lens element 23, in this order from the object. The positive third lens group 30 includes a positive lens element 31, and a cemented lens elements having a positive lens element 32 and a negative lens element 33, in this order from the object. The positive fourth lens group 40 includes a single lens element. The symbol CG designates the cover glass (filter group) positioned in front of the imaging device. The diaphragm S is provided 0.97 mm in front (on the object side) of the positive third lens group 30 (surface No. 9).

TABLE 1

$F_{NO} = 1:2.8–3.5–4.9$
$f = 8.00–18.00–38.00$
$W = 31.5–14.3–6.9$
$f_B = 0.00—0.00—0.00$

| Surf. No. | r | d | Nd | νd |
|---|---|---|---|---|
| 1* | 19.473 | 3.38 | 1.43875 | 95.0 |
| 2 | −113.217 | 0.60–8.06–11.43 | — | — |
| 3 | 86.212 | 0.90 | 1.88300 | 40.8 |
| 4 | 8.440 | 3.31 | — | — |
| 5 | −20.703 | 0.80 | 1.77250 | 49.6 |
| 6 | 59.190 | 0.62 | — | — |
| 7 | 21.371 | 2.59 | 1.76182 | 26.5 |
| 8 | −44.775 | 25.87–12.85–2.91 | — | — |
| 9* | 10.661 | 2.97 | 1.49700 | 81.6 |
| 10* | −24.720 | 0.10 | — | — |
| 11 | 7.605 | 2.80 | 1.49700 | 81.6 |
| 12 | 10.736 | 1.44 | 1.84666 | 23.8 |
| 13 | 5.307 | 5.22–11.09–22.34 | — | — |
| 14 | 19.733 | 2.80 | 1.69680 | 55.5 |
| 15 | ∞ | 5.64 | — | — |
| 16 | ∞ | 1.60 | 1.51633 | 64.1 |
| 17 | ∞ | 0.50 | — | — |
| 18 | ∞ | 0.50 | 1.51633 | 64.1 |
| 19 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 1 | 0.00 | −0.44325 × 10⁻⁵ | −0.25463 × 10⁻⁷ | 0.00 |
| 9 | 0.00 | −0.14676 × 10⁻³ | −0.29460 × 10⁻⁶ | −0.13910 × 10⁻⁶ |
| 10 | 0.00 | 0.76053 × 10⁻⁵ | −0.62878 × 10⁻⁶ | −0.11514 × 10⁻⁶ |

[Embodiment 2]

Figure 5:
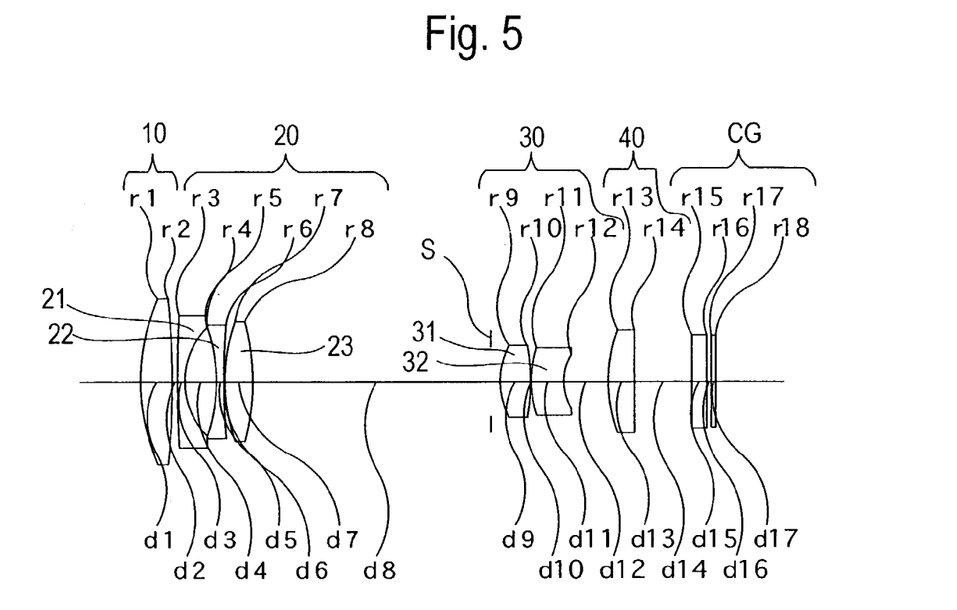
FIG. 5 is a lens arrangement of a zoom lens system according to a second embodiment of the present invention.
Figures 6A, 6B:
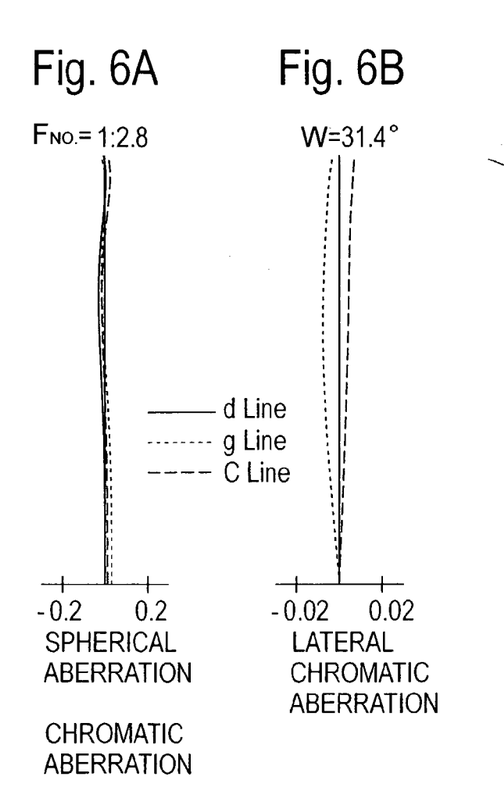
FIGS. 6A, 6B, 6C and 6D show aberrations occurred in the lens arrangement shown in FIG. 5 at the short focal length extremity.
Figure 6C:
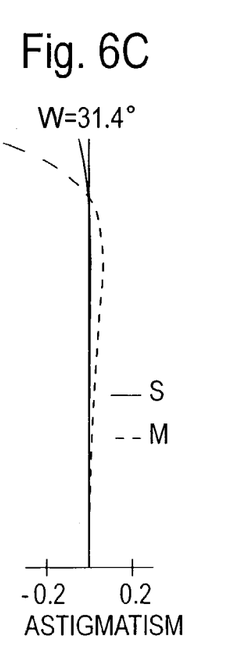
Figure 6D:
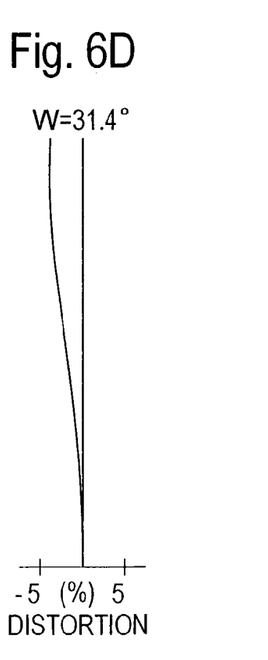
Figures 7A, 7B, 7C:
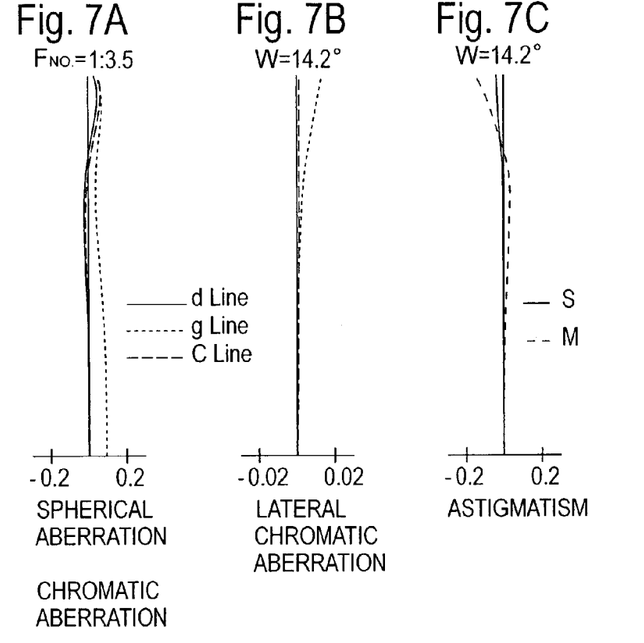
FIGS. 7A, 7B, 7C and 7D show aberrations occurred in the lens arrangement shown in FIG. 5 at an intermediate focal length.
Figure 7D:
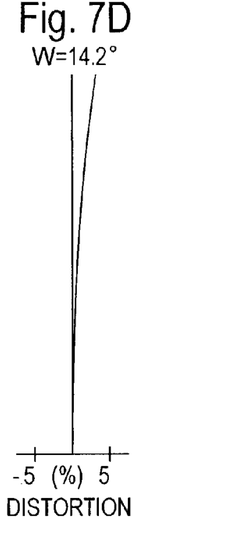
Figures 8A, 8B, 8C:
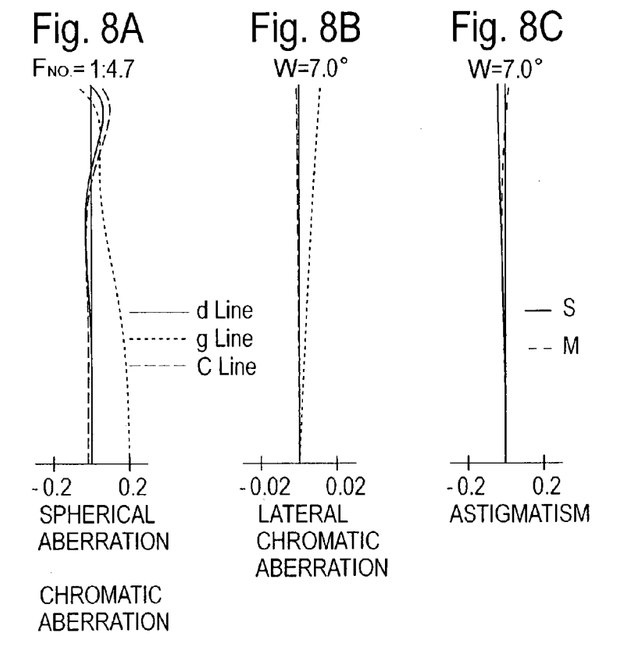
FIGS. 8A, 8B, 8C and 8D show aberrations occurred in the lens arrangement shown in FIG. 5 at the long focal length extremity.
Figure 8D:
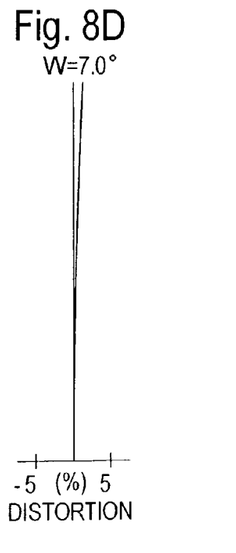

FIG. 5 is the lens arrangement of the zoom lens system according to the second embodiment of the present invention. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment.

The basic lens arrangement is the same as that of the first embodiment except that for the positive third lens group 30 includes a positive lens element 31 and a negative lens element 32, in this order from the object. The diaphragm S is provided 0.97 mm in front (on the object side) of the positive third lens group 30 (surface No. 9).

TABLE 2

$F_{NO}$ = 1:2.8–3.5–4.7
f = 8.00–18.00–38.00
W = 31.4–14.2–7.0
$f_B$ = 0.00—0.00—0.00

| Surf. No. | r | d | Nd | νd |
|---|---|---|---|---|
| 1* | 22.060 | 3.50 | 1.43875 | 95.0 |
| 2 | −83.806 | 0.61–9.07–12.98 | — | — |
| 3 | 146.618 | 0.80 | 1.88300 | 40.8 |
| 4 | 8.312 | 3.48 | — | — |
| 5 | −17.855 | 0.80 | 1.77250 | 49.6 |
| 6 | 80.497 | 0.10 | — | — |
| 7 | 19.831 | 3.00 | 1.69895 | 30.1 |
| 8 | −25.165 | 27.00–13.59–2.91 | — | — |
| 9* | 7.757 | 3.30 | 1.49700 | 81.6 |
| 10* | −21.931 | 0.10 | — | — |
| 11 | 11.899 | 3.60 | 1.92286 | 21.3 |
| 12 | 5.512 | 4.77–10.60–21.49 | — | — |
| 13 | 16.430 | 2.80 | 1.58913 | 61.2 |
| 14 | ∞ | 6.24 | — | — |
| 15 | ∞ | 1.60 | 1.51633 | 64.1 |
| 16 | ∞ | 0.50 | — | — |
| 17 | ∞ | 0.50 | 1.51633 | 64.1 |
| 18 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 1 | 0.00 | $-0.40179 \times 10^{-5}$ | $-0.29658 \times 10^{-7}$ | 0.00 |
| 9 | 0.00 | $-0.30380 \times 10^{-3}$ | $-0.83596 \times 10^{-6}$ | $-0.31215 \times 10^{-6}$ |
| 10 | 0.00 | $0.28981 \times 10^{-4}$ | $0.65248 \times 10^{-6}$ | $-0.29311 \times 10^{-6}$ |

[Embodiment 3]

Figure 9:
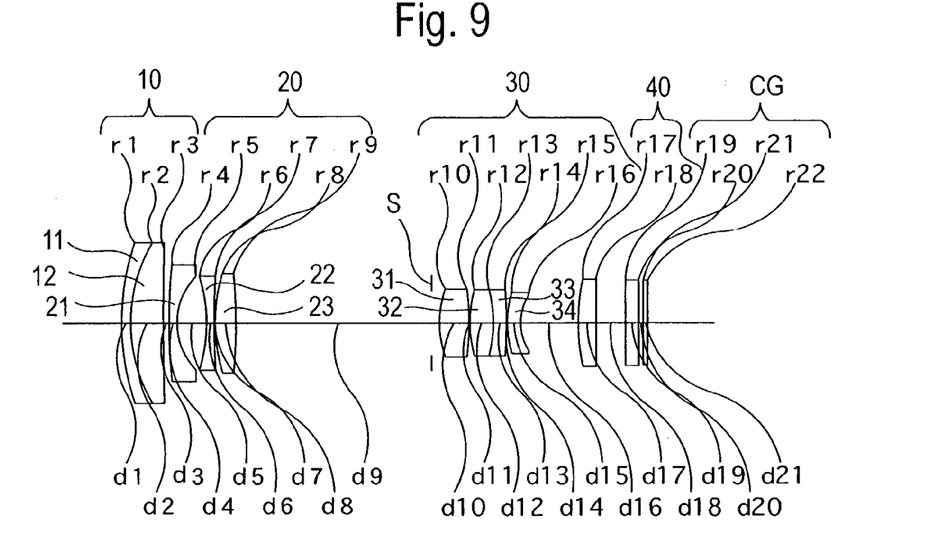
FIG. 9 is a lens arrangement of a zoom lens system according to a third embodiment of the present invention.
Figure 10A:
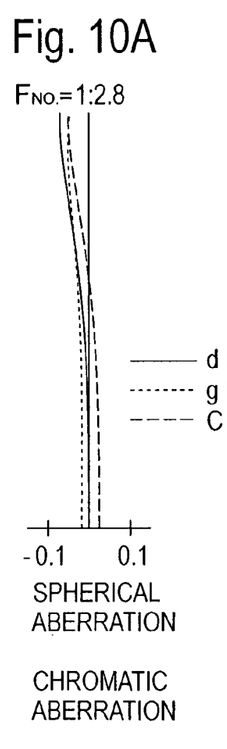
FIGS. 10A, 10B, 10C and 10D show aberrations occurred in the lens arrangement shown in FIG. 9 at the short focal length extremity.
Figure 10B:
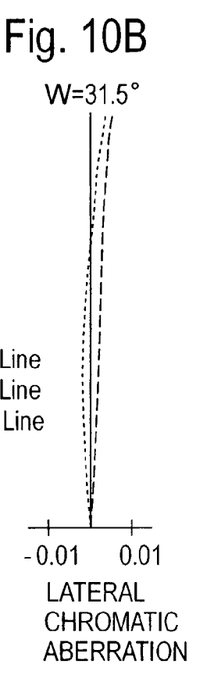
Figure 10C:
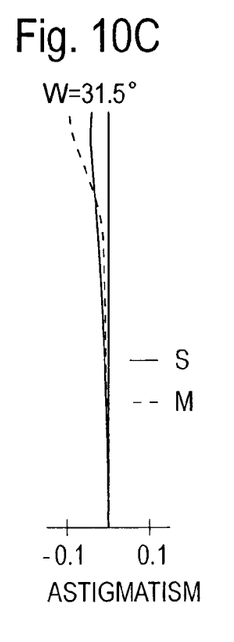
Figure 10D:
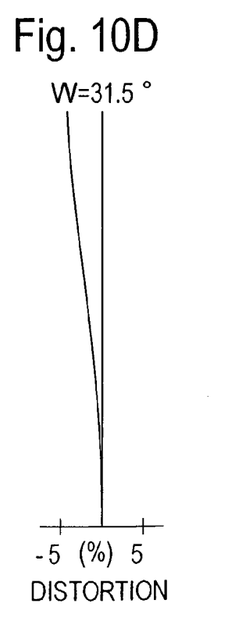
Figures 11A, 11B:
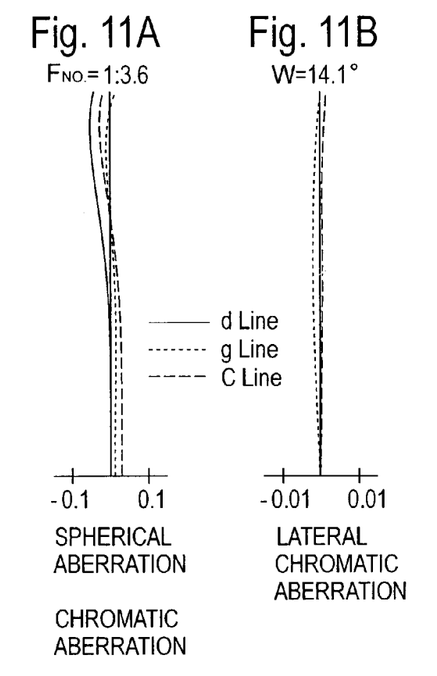
FIGS. 11A, 11B, 11C and 11D show aberrations occurred in the lens arrangement shown in FIG. 9 at an intermediate focal length.
Figure 11C:
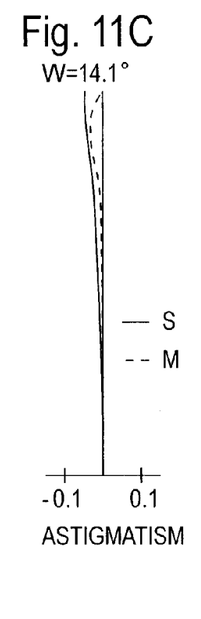
Figure 11D:
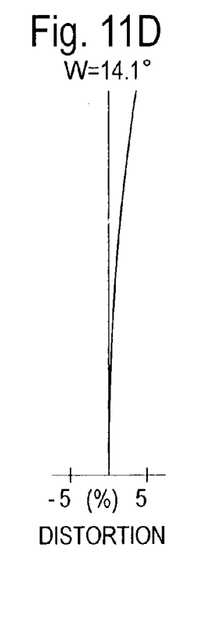
Figures 12A, 12B:
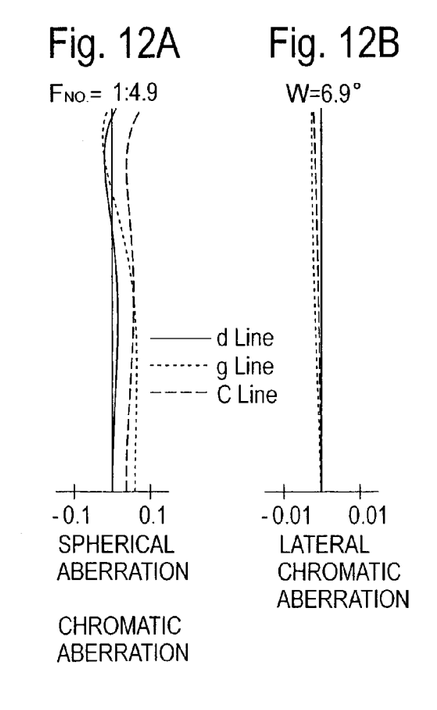
FIGS. 12A, 12B, 12C and 12D show aberrations occurred in the lens arrangement shown in FIG. 9 at the long focal length extremity.
Figure 12C:
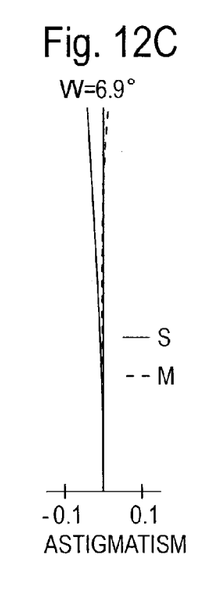
Figure 12D:
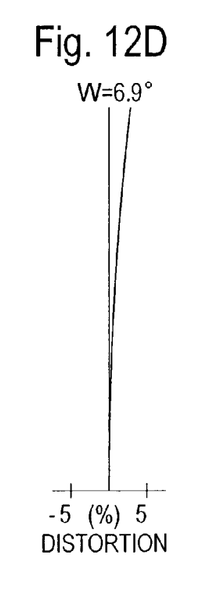

FIG. 9 is the lens arrangement of the zoom lens system according to the third embodiment of the present invention. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 2D show aberrations occurred in the lens arrangement shown in FIG. 9 at the long focal length extremity. Table 3 shows the numerical data of the third embodiment.

The basic lens arrangement is the same as that of the first embodiment except that (i) the positive first lens group 10 includes cemented lens elements having a negative lens element 11 and a positive lens element 12; and (ii) the positive third lens group 30 includes a positive lens element 31, cemented lens elements having a positive lens element 32 and a negative lens element 33, and a negative lens element 34, in this order from the object. The diaphragm S is provided 0.90 mm in front (on the object side) of the positive third lens group 30 (surface No. 10).

TABLE 3

$F_{NO}$ = 1:2.8–3.6–4.9
f = 8.00–18.00–38.00
W = 31.5–14.1–6.9
$f_B$ = 0.00—0.00—0.00

| Surf. No. | r | d | Nd | νd |
|---|---|---|---|---|
| 1 | 28.136 | 1.00 | 1.84666 | 23.8 |
| 2 | 17.647 | 3.67 | 1.77250 | 49.6 |
| 3 | 360.525 | 0.65–8.33–12.50 | — | — |
| 4 | 64.697 | 0.90 | 1.88300 | 40.8 |
| 5 | 7.593 | 3.31 | — | — |
| 6 | −17.513 | 0.80 | 1.77250 | 49.6 |
| 7 | 92.664 | 0.10 | — | — |
| 8 | 19.259 | 2.34 | 1.84666 | 23.8 |
| 9 | −57.895 | 22.98–11.74–3.00 | — | — |
| 10* | 10.820 | 3.27 | 1.58913 | 61.2 |
| 11 | −31.253 | 0.10 | — | — |
| 12 | 13.549 | 2.62 | 1.48749 | 70.2 |
| 13 | −14.536 | 1.50 | 1.80518 | 25.4 |
| 14 | −46.516 | 0.10 | — | — |
| 15 | 11.836 | 1.50 | 1.80100 | 35.0 |
| 16 | 5.581 | 6.51–13.10–21.26 | — | — |
| 17 | 23.903 | 2.00 | 1.58913 | 61.2 |
| 18 | ∞ | 3.34–1.69–1.50 | — | — |
| 19 | ∞ | 1.51 | 1.51633 | 64.1 |
| 20 | ∞ | 0.50 | — | — |
| 21 | ∞ | 0.50 | 1.51633 | 64.1 |
| 22 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 10 | $-0.10000 \times 10^{-1}$ | $-0.46858 \times 10^{-4}$ | $0.73529 \times 10^{-6}$ | $-0.22676 \times 10^{-7}$ |

[Embodiment 4]

Figure 13:
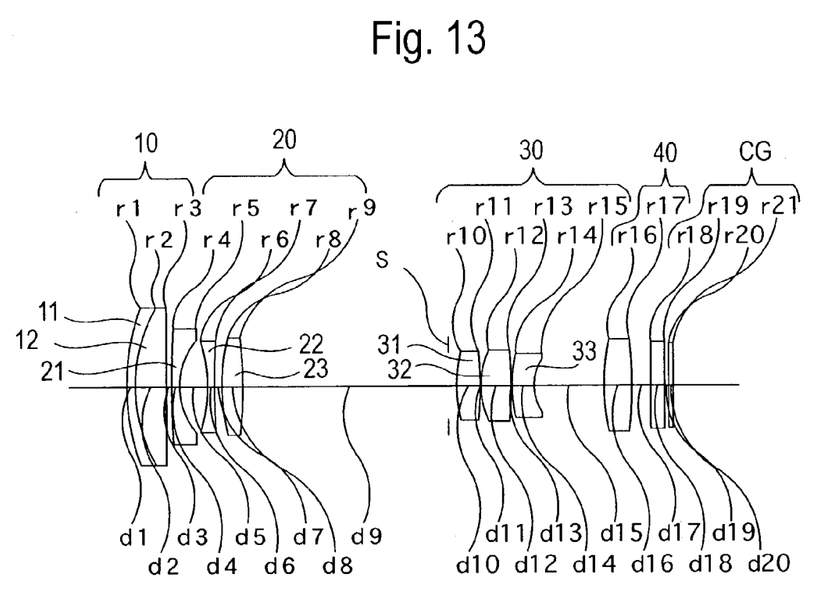
FIG. 13 is a lens arrangement of a zoom lens system according to a fourth embodiment of the present invention.
Figures 14A, 14B:
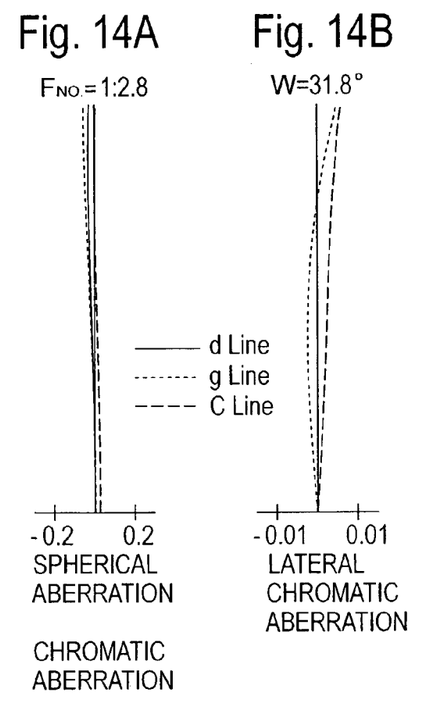
FIGS. 14A, 14B, 14C and 14D show aberrations occurred in the lens arrangement shown in FIG. 13 at the short focal length extremity.
Figure 14C:
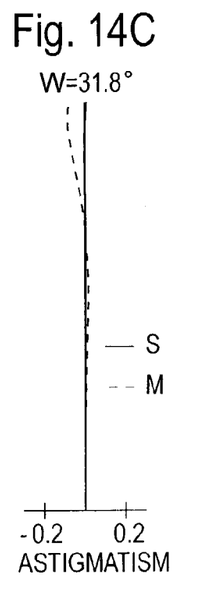
Figure 14D:
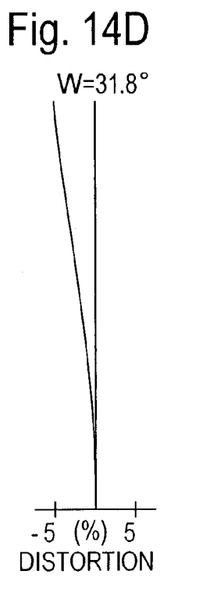
Figures 15A, 15B, 15C, 15D:
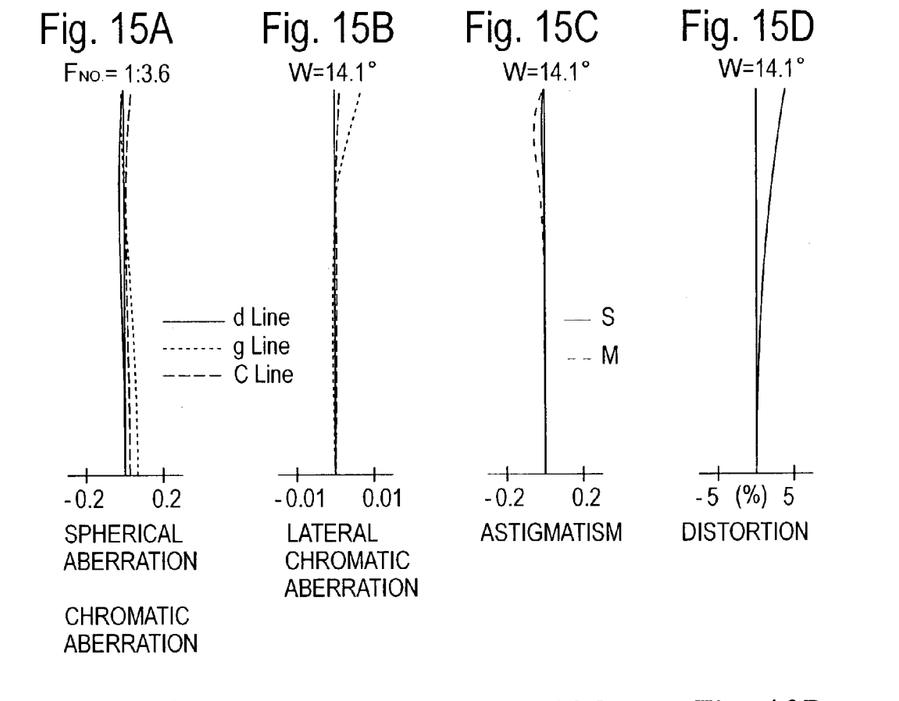
FIGS. 15A, 15B, 15C and 15D show aberrations occurred in the lens arrangement shown in FIG. 13 at an intermediate focal length.
Figures 16A, 16B, 16C, 16D:
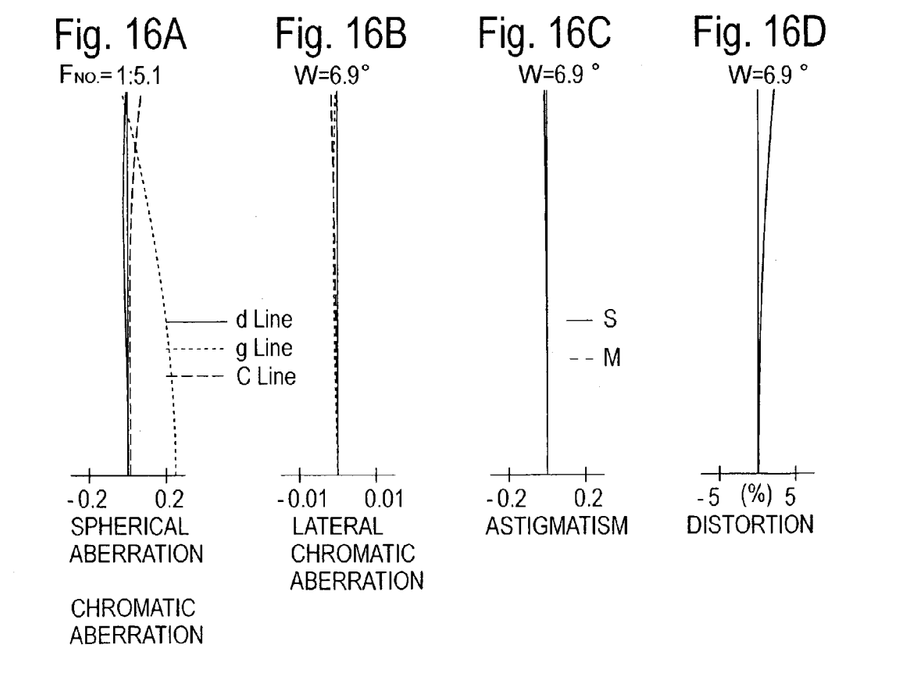
FIGS. 16A, 16B, 16C and 16D show aberrations occurred in the lens arrangement shown in FIG. 13 at the long focal length extremity.

FIG. 13 is the lens arrangement of the zoom lens system according to the fourth embodiment of the present invention. FIGS. 14A through 14D show aberrations occurred in the lens arrangement shown in FIG. 13 at the short focal length extremity. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical data of the fourth embodiment.

The basic lens arrangement is the same as that of the first embodiment except that (i) the positive first lens group 10 includes cemented lens elements having a negative lens element 11 and a positive lens element 12; and (ii) the positive third lens group 30 includes a positive lens element 31, a positive lens element 32, and a negative lens element 33, in this order from the object (without including a cemented lens elements). The diaphragm S is provided 0.97 mm in front (on the object side) of the third lens group 30 (surface No. 10).

TABLE 4

$F_{NO} = 1:2.8–3.6–5.1$
$f = 8.00–18.00–38.00$
$W = 31.8–14.1–6.9$
$f_B = 0.00—0.00—0.00$

| Surf. No. | r | d | Nd | vd |
|---|---|---|---|---|
| 1 | 25.892 | 1.00 | 1.84666 | 23.8 |
| 2 | 18.261 | 3.56 | 1.69680 | 55.5 |
| 3 | −13736.760 | 0.60–8.42–11.70 | — | — |
| 4 | 118.738 | 0.90 | 1.83481 | 42.7 |
| 5 | 8.156 | 3.22 | — | — |
| 6 | −17.371 | 0.80 | 1.77250 | 49.6 |
| 7 | 83.152 | 0.87 | — | — |
| 8 | 23.245 | 2.40 | 1.78472 | 25.7 |
| 9 | −45.905 | 24.57–12.39–2.91 | — | — |
| 10* | 16.092 | 2.65 | 1.58913 | 61.2 |
| 11 | −41.127 | 0.10 | — | — |
| 12 | 9.340 | 3.47 | 1.48749 | 70.2 |
| 13 | −49.448 | 0.10 | — | — |
| 14 | 16.243 | 2.50 | 1.84666 | 23.8 |
| 15 | 5.445 | 7.99–13.18–22.82 | — | — |
| 16 | 24.474 | 3.20 | 1.58913 | 61.2 |
| 17 | −46.889 | 2.19–2.07–2.91 | — | — |
| 18 | ∞ | 1.60 | 1.51633 | 64.1 |
| 19 | ∞ | 0.50 | — | — |
| 20 | ∞ | 0.50 | 1.51633 | 64.1 |
| 21 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 10 | 0.00 | $-0.13564 \times 10^{-3}$ | $-0.51381 \times 10^{-6}$ | $-0.23738 \times 10^{-8}$ |

[Embodiment 5]

Figure 17:
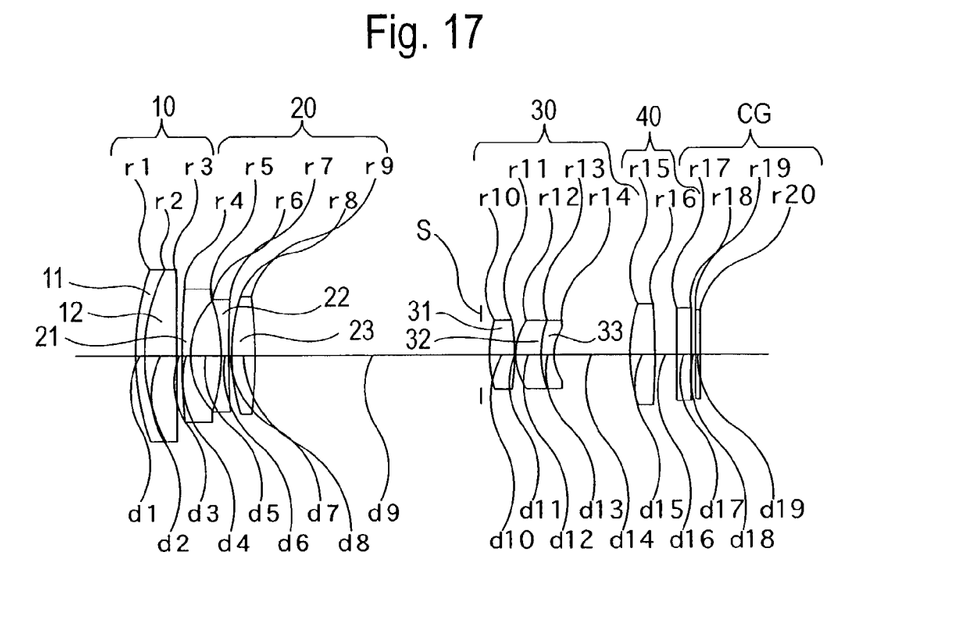
FIG. 17 is a lens arrangement of a zoom lens system according to a fifth embodiment of the present invention.
Figures 18A, 18B:
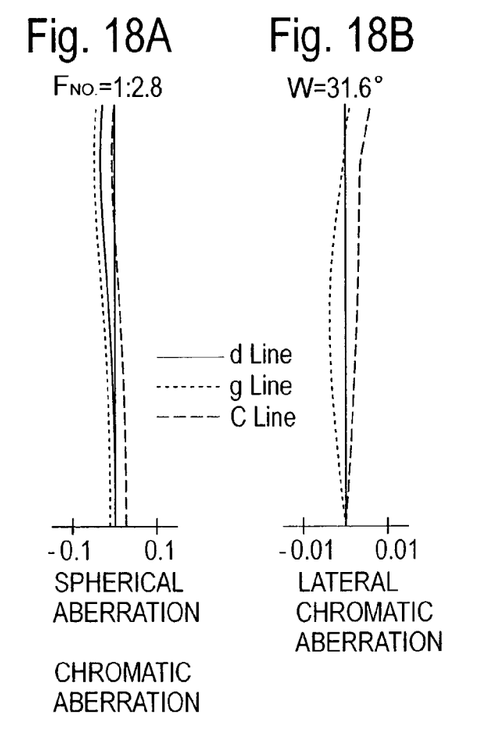
FIGS. 18A, 18B, 18C and 18D show aberrations occurred in the lens arrangement shown in FIG. 17 at the short focal length extremity.
Figure 18C:
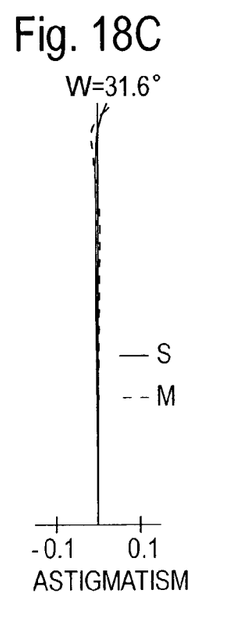
Figure 18D:
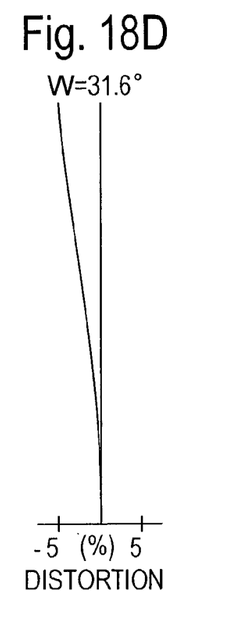
Figures 19A, 19B:
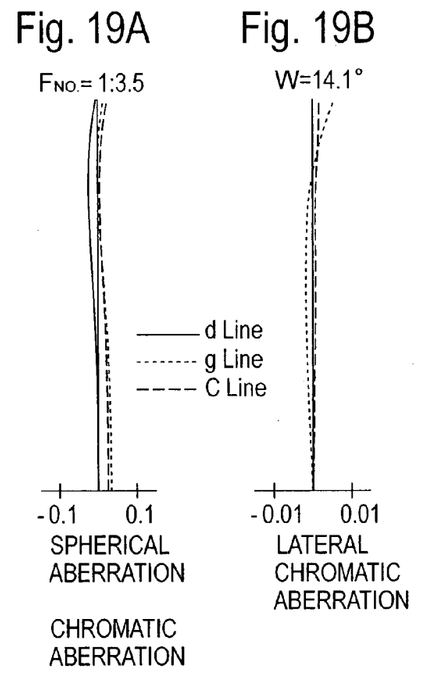
FIGS. 19A, 19B, 19C and 19D show aberrations occurred in the lens arrangement shown in FIG. 17 at an intermediate focal length.
Figure 19C:
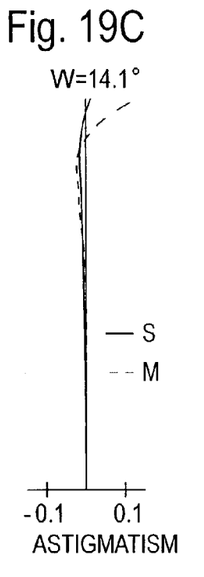
Figure 19D:
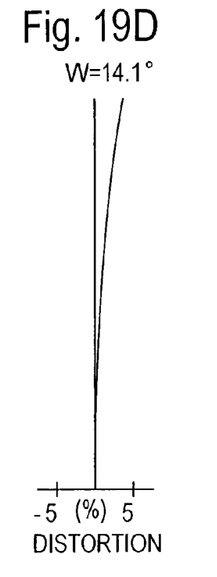
Figures 20A, 20B:
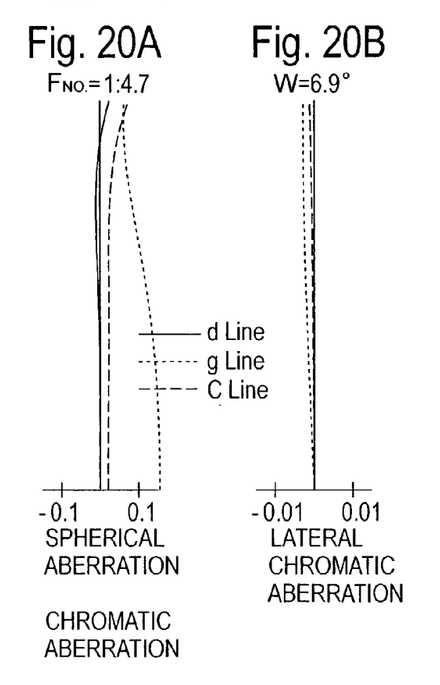
FIGS. 20A, 20B, 20C and 20D show aberrations occurred in the lens arrangement shown in FIG. 17 at the long focal length extremity.
Figure 20C:
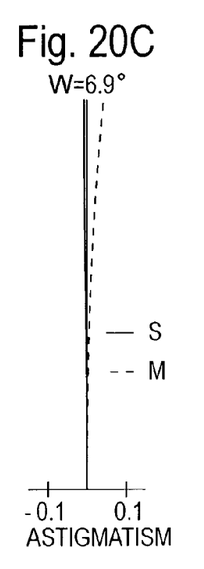
Figure 20D:
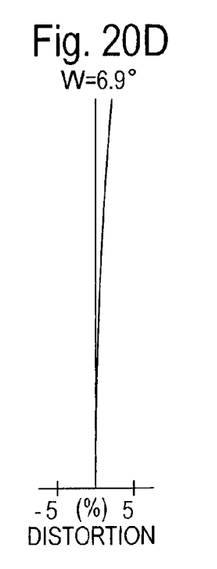

FIG. 17 is the lens arrangement of the zoom lens system according to the fifth embodiment of the present invention. FIGS. 18A through 18D show aberrations occurred in the lens arrangement shown in FIG. 17 at the short focal length extremity. FIGS. 19A through 19D show aberrations occurred in the lens arrangement shown in FIG. 17 at an intermediate focal length. FIGS. 20A through 20D show aberrations occurred in the lens arrangement shown in FIG. 17 at the long focal length extremity. Table 5 shows the numerical data of the fifth embodiment.

The basic lens arrangement is the same as that of the first embodiment except that the positive first lens group 10 includes cemented lens elements having a negative lens element 11 and a positive lens element 12. The diaphragm S is provided 0.97 mm in front (on the object side) of the third lens group 30 (surface No. 10).

TABLE 5

$F_{NO} = 1:2.8–3.5–4.7$
$f = 8.04–18.07–37.98$
$W = 31.6–14.1–6.9$
$f_B = 0.00—0.00—0.00$

| Surf. No. | r | d | Nd | vd |
|---|---|---|---|---|
| 1 | 28.813 | 1.00 | 1.84666 | 23.8 |
| 2 | 20.678 | 3.58 | 1.69680 | 55.5 |
| 3 | 1446.857 | 0.60–10.04–14.20 | — | — |
| 4 | 92.353 | 0.90 | 1.88300 | 40.8 |

TABLE 5-continued $F_{NO} = 1:2.8–3.5–4.7$
$f = 8.04–18.07–37.98$
$W = 31.6–14.1–6.9$
$f_B = 0.00—0.00—0.00$

| Surf. No. | r | d | Nd | vd |
|---|---|---|---|---|
| 5 | 8.763 | 3.43 | — | — |
| 6 | −18.852 | 0.80 | 1.77250 | 49.6 |
| 7 | 120.327 | 0.36 | — | — |
| 8 | 22.787 | 2.57 | 1.80518 | 25.4 |
| 9 | −49.198 | 26.07–13.22–2.91 | — | — |
| 10* | 13.052 | 2.83 | 1.58636 | 60.9 |
| 11* | −25.146 | 0.10 | — | — |
| 12 | 6.656 | 2.80 | 1.49700 | 81.6 |
| 13 | 11.622 | 1.40 | 1.84666 | 23.8 |
| 14 | 4.942 | 8.44–13.37–22.34 | — | — |
| 15 | 17.340 | 2.80 | 1.58913 | 61.2 |
| 16 | −80.383 | 2.56–2.52–3.30 | — | — |
| 17 | ∞ | 1.60 | 1.51633 | 64.1 |
| 18 | ∞ | 0.50 | — | — |
| 19 | ∞ | 0.50 | 1.51633 | 64.1 |
| 21 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 10 | 0.00 | $-0.10366 \times 10^{-3}$ | $0.38203 \times 10^{-6}$ | $-0.70823 \times 10^{-7}$ |
| 11 | 0.00 | $0.13116 \times 10^{-4}$ | $0.41745 \times 10^{-6}$ | $-0.66752 \times 10^{-7}$ |

Table 6 shows the numerical values of each condition for each embodiment.

TABLE 6

| | Embod. 1 | Embod. 2 | Embod. 3 | Embod. 4 | Embod. 5 |
|---|---|---|---|---|---|
| Cond. (1) | 0.707 | 0.715 | 0.786 | 0.745 | 0.786 |
| Cond. (2) | 2.577 | 2.450 | 2.521 | 2.815 | 2.707 |

As can be understood from Table 6, each embodiment satisfies each condition. Furthermore, as can be understood from the aberration diagrams, the various aberrations are relatively well corrected.

According to the above description, a zoom lens system for a digital camera having a zoom ratio of more than 4, and having a half angle-of-view of more than 30° at the short focal length extremity can be achieved.

What is claimed is:

1. A zoom lens system comprising a positive first lens group that is movable, a negative second lens group that is movable, a positive third lens group that is movable, and positive fourth lens group which is movable or stationary, in this order from an object, wherein upon zooming from the short focal length extremity to the long focal length extremity, the distance between said positive first lens group and said negative second lens group is increased; the distance between said negative second lens group and said positive third lens group is decreased; and the distance between said positive third lens group and said positive fourth lens group is increased; and wherein said zoom lens system satisfies the following conditions:

$0.5 < |f2|/f3 \leq 0.745 (f2 < 0)$ $2 < m3t/m3w \leq 2.815$ wherein fi designates the focal length of the ith lens group (i=1~3);

m3t designates the paraxial lateral magnification of said positive third lens group at the long focal length extremity when said object at infinity is in an in-focus state; and m3w designates the paraxial lateral magnification of the positive third lens group at the short focal length extremity when said object at infinity is in an in-focus state.

2. The zoom lens system according to claim 1, wherein said positive first lens group comprises a positive lens element, or comprises a negative lens element and a positive lens element.

3. The zoom lens system according to claim 1, wherein said positive third lens group comprises a positive lens element and a negative lens element, or comprises two positive lens elements and a negative lens element.

4. The zoom lens system according to claim 1, wherein said positive fourth lens group comprises a positive lens element.

5. The zoom lens system according to claim 1, wherein focusing is performed by moving said positive fourth lens group.

* * * * *